US011438943B2

(12) United States Patent
Wang et al.

(10) Patent No.: US 11,438,943 B2
(45) Date of Patent: Sep. 6, 2022

(54) METHOD AND DEVICE FOR DEVICE-TO-DEVICE (D2D) COMMUNICATION

(71) Applicant: Nokia Technologies Oy, Espoo (FI)

(72) Inventors: Zhi Wang, Shandong (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/630,525

(22) PCT Filed: Jul. 25, 2017

(86) PCT No.: PCT/CN2017/094314
§ 371 (c)(1),
(2) Date: Jan. 13, 2020

(87) PCT Pub. No.: WO2019/019020
PCT Pub. Date: Jan. 31, 2019

(65) Prior Publication Data
US 2021/0153270 A1    May 20, 2021

(51) Int. Cl.
*H04W 76/14* (2018.01)
*H04W 76/11* (2018.01)
*H04W 8/26* (2009.01)

(52) U.S. Cl.
CPC ............ *H04W 76/14* (2018.02); *H04W 8/26* (2013.01); *H04W 76/11* (2018.02)

(58) Field of Classification Search
CPC ........ H04W 76/14; H04W 76/11; H04W 8/26
USPC ........................................................ 455/39
See application file for complete search history.

(56) References Cited

U.S. PATENT DOCUMENTS

2014/0094119 A1*  4/2014  Stojanovski .......... H04W 48/16
                                                      455/41.1
2017/0019886 A1*  1/2017  Patel .................... H04W 8/005

FOREIGN PATENT DOCUMENTS

CN    104956763 A    9/2015
CN    106576336 A    4/2017
WO    WO-2016117923 A1    7/2016
(Continued)

OTHER PUBLICATIONS

Intel Corporation: "Support of one-to-one Communication", 3GPP Draft; R2-151112 One-One Communication V3, 3$^{rd}$ Generation Partnership Project (3GPP), Moile Competence Centre; 650, Route Des Lucioles; F-06921 Sophia-Antipolis Cedex; France. vol. RAN WG2, No. Bratislava, Slovakia; Apr. 20, 2015-Apr. 24, 2015. Apr. 19, 2015, XP050936093, Retrieved from the Internet: URL: http://www.3gpp.org/ftp/Meetings_3GPP_SYNC/RAN2/Docs/ [retrieved on Apr. 19, 2015].

*Primary Examiner* — Eugene Yun
(74) *Attorney, Agent, or Firm* — Harrington & Smith

(57) ABSTRACT

Embodiments of the disclosure provide a method and device for facilitating D2D communication. According to the embodiments of the present disclosure, the identifier of the terminal device for D2D communication may be generated based on the status information of the network and the terminal device. According to the embodiments of the present disclosure, the generated identifier may be meaningful to the network device and also may be unique for the terminal device. According to the embodiments of the present disclosure, the method may also be implemented in a M2M system.

26 Claims, 6 Drawing Sheets

(56) References Cited

FOREIGN PATENT DOCUMENTS

WO    WO 2017/119985 A1    7/2017

\* cited by examiner

METHOD AND DEVICE FOR DEVICE-TO-DEVICE (D2D) COMMUNICATION

Cross Reference to Related Application

This patent application is a U.S. National Stage application of International Patent Application Number PCT/CN2017/094314 filed Jul. 25, 2017, which is hereby incorporated by reference in its entirety.

FIELD OF THE INVENTION

Embodiments of the present disclosure generally relate to communication techniques, and more particularly, to a method and device for device-to-device (D2D) communication.

BACKGROUND OF THE INVENTION

Nowadays, D2D communication has been regarded as an efficient way to improve system performance for future wireless networks. D2D communication is also viewed as a key evolutionary technology for 5G communication. For example, 3GPP TS 23.303 defines D2D Proximity-based Service (ProSe) architecture. In 3GPP D2D standards, ProSe UE ID is defined as a key identifier for ProSe direct communication. It is the link layer identifier used for subsequent direct one-to-one and one-to-many communication after D2D discovery. According to TS 23.303, the ProSe UE ID is assigned by the ProsSe Key Management Function as defined in TS 33.303 when bearer-level security is used. When bearer-level security is not used, the ProSe UE ID is either configured in the UE or self-assigned by the UE.

SUMMARY OF THE INVENTION

Generally, embodiments of the present disclosure relate to a method for facilitating D2D communication and the corresponding network device and terminal device.

In a first aspect, embodiments of the present disclosure provide a method implemented at a network device for facilitating D2D communication. The method comprises: determining status information of a network where the terminal device locates; determining length of different parts of an identifier to be used by the terminal device in the D2D communication; generating an indication of the status information and the length; and sending the indication to the terminal device to enable the terminal device to generate the identifier.

In a second aspect, embodiments of the present disclosure provide a method implemented at a terminal device for facilitating D2D communication. The method comprises receiving, from a network device, an indication for generating an identifier to be used by the terminal device in the D2D communication; determining, from the indication, status information of a network where the terminal device locates; determining, from the indication, length of different parts of the identifier; and generating a first identifier based on the status information and the length.

In a third aspect, embodiments of the disclosure provide a network device. The network device comprises: at least on controller; and a memory coupled to the at least one processor, the memory storing instructions therein, the instructions, when executed by the at least one processor, causing the network device to perform acts including: determining status information of a network where the terminal device locates; determining length of different parts of an identifier to be used by the terminal device in the D2D communication; generating an indication of the status information and the length; and sending the indication to the terminal device to enable the terminal device to generate the identifier.

In a fourth aspect, embodiments of the disclosure provide a terminal device. The terminal device comprises: at least on controller; and a memory coupled to the at least one processor, the memory storing instructions therein, the instructions, when executed by the at least one processor, causing the network device to perform acts including: receiving, from a network device, an indication for generating an identifier to be used by the terminal device in the D2D communication; determining, from the indication, status information of a network where the terminal device locates; determining, from the indication, length of different parts of the identifier; and generating a first identifier based on the status information and the length.

In a fifth aspect, embodiments of the disclosure provide a computer readable medium. The computer readable medium stores instructions thereon, the instructions, when executed by at least one processing unit of a machine, causing the machine to implement: determining status information of a network where the terminal device locates; determining length of different parts of an identifier to be used by the terminal device in the D2D communication; generating an indication of the status information and the length; and sending the indication to the terminal device to enable the terminal device to generate the identifier.

In a sixth aspect, embodiments of the disclosure provide a further computer readable medium. The further computer readable medium stores instructions thereon, the instructions, when executed by at least one processing unit of a machine, causing the machine to implement: receiving, from a network device, an indication for generating an identifier to be used by the terminal device in the D2D communication; determining, from the indication, status information of a network where the terminal device locates; determining, from the indication, length of different parts of the identifier; and generating a first identifier based on the status information and the length.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
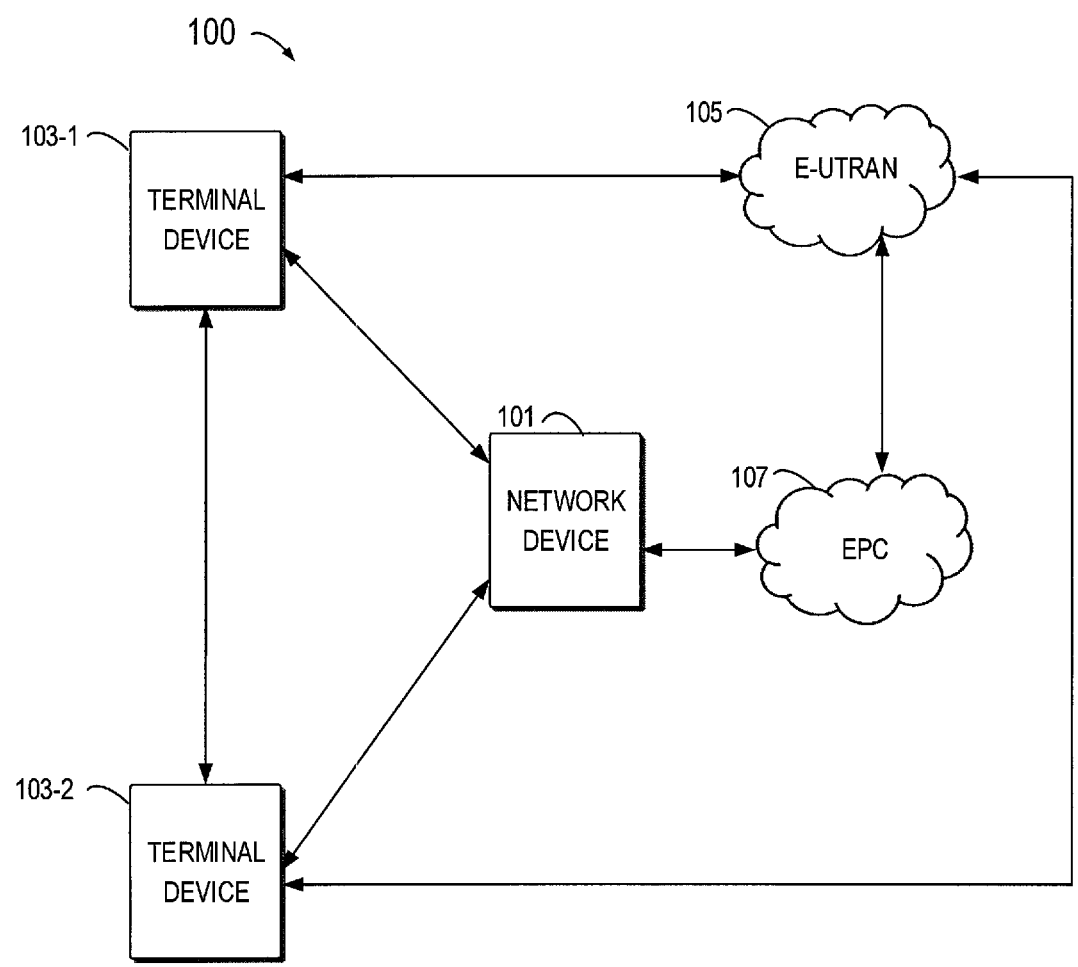
FIG. 1 illustrates a schematic diagram of a communication system 100 according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "device-to-device (D2D) communication" used herein refers to a technology enabling direct communications between the terminal devices by reusing cell resources under a system control, so that user data may be transmitted directly between terminal devices without network transferring.

As described above, the D2D communication is considered as one of key evolution technologies for 5G. There are several conventional methods for generating the identifiers, for example ProSe UE ID, for terminal devices in D2D communication. However, all of the conventional methods are not able to ensure uniqueness of the generated identifier. Further, there are other issues that need to be addressed, for example, how to handle the conflicts of identifier, how to self-assign an identifier, how to synchronize the self-assigned identifier with network, how to distribute the self-assigned identifier and the like.

In order to at least in part solve above and other potential problems, embodiments of the present disclosure provide a method for facilitating D2D communication. Now some example embodiments of the present disclosure will be described below with reference to the figures. However, those skilled in the art will readily appreciate that the detailed description given herein with respect to these figures is for explanatory purpose as the present disclosure extends beyond these limited embodiments.

FIG. 1 illustrates a schematic diagram of an environment in which embodiments of the present disclosure can be implemented. The environment 100, which is a part of a communication network, includes a network device 101 and one or more terminal device 103-1, 103-2, . . . , 103-N (collectively referred to as "terminal devices" 103). In some embodiments, by way of example, the environment 100 may include an EPC 107. It should be noted that the environment 100 may also include other elements which are omitted for the purpose of clarity. The network device 101 may communicate 4 with the terminal devices 103 via interface PC3. The D2D communication among the terminal devices 103, for example the terminal device 130-1 directly communicating with the terminal device 130-2, may be via interface PC5. It is to be understood that the number of network devices and terminal devices shown in FIG. 1 is given for the purpose of illustration without suggesting any limitations. The network 100 may include any suitable number of network devices and terminal devices.

Communications in environment 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Conventionally, the network device assigns an identifier to the terminal device for the D2D communication. In such situation, the identifier assigned by the network device may not be unique, which may cause conflicts between different terminal devices. The terminal device may be configured with the identifier for the D2D communication or may be self-assign the identifier for the D2D communication. In this situation, the identifier may also not be unique, which may cause conflicts between different terminal devices and the identifier may be meaningless to the network device since the process of generating the identifier does not involve the network device. In a word, none of the conventional process of generating the identifier for terminal devices for the D2D communication involves the network device and the terminal device at the same time. Unlike conventional methods, the identifier for the terminal device 103 for the D2D communication may be generated associated with the network device 101 and the terminal device 103. In this way, the generated identifier may be unique and meaningful to the network device 101.

Now some example embodiments of the present disclosure will be described below with reference to FIGS. 2-4.

Figure 2:
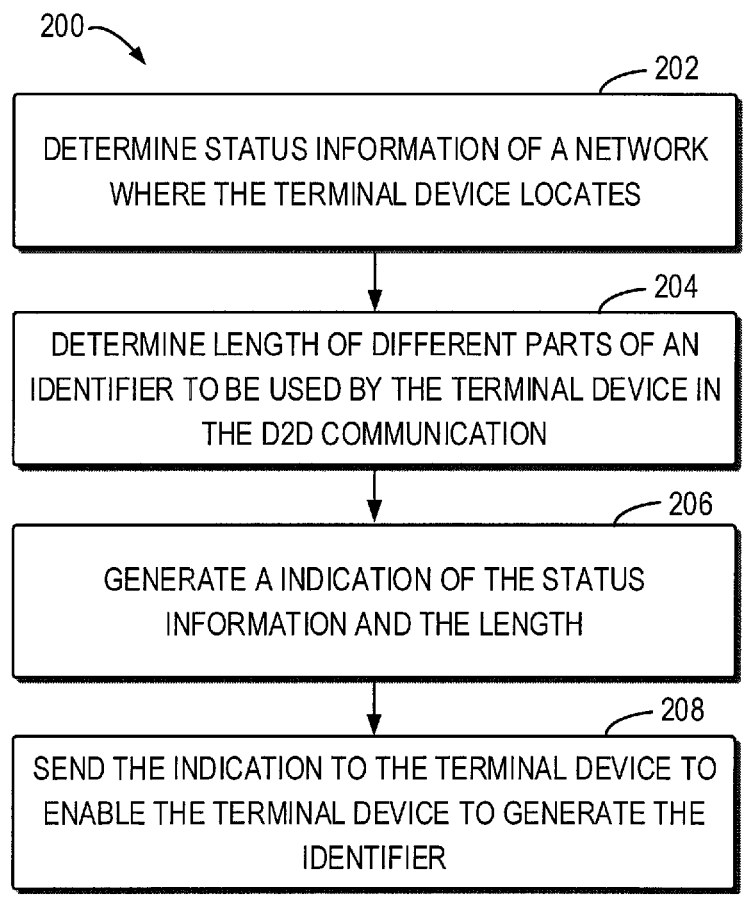
FIG. 2 illustrates a flow chart of a method for facilitating D2D communication implemented at a network device according to embodiments of the present disclosure.

FIG. 2 illustrates a flow chart of method 200 that may be implemented at the network device 101, in accordance with an example embodiment of the present disclosure. At block 202, the network device 101 determines status information of a network where the terminal device 103 locates. In some embodiments, the network device 101 may send an initial identifier to the terminal device 101 for performing the D2D communication prior to block 202. By way of example, the status information of the network may be geographic area ID, for example RAN cell ID. In an example embodiment, the status information may be ProSe application ID. It should be noted that the status information may be any information related to the network that are available for the terminal devices 103 in the generation of the identifier, for example ProSe Application Code, filter, communication mode, operator ID, context ID discovery group ID, existing ProSe UE ID and the like.

At block 204, the network device 101 determines length of different parts of an identifier to be used by the terminal device 103 in the D2D communication. In an example embodiment, the identifier may include two parts: a first part related to the network device 101 and a second part related to the terminal device 103. In this embodiment, the network device 101 determines the lengths of the above two parts. In an example embodiment, the second part may be zero. Alternatively, the second part may be up to the maximum length of the identifier. It should be noted that the length of the second part may be any length from zero to the maximum length of the identifier.

It should be noted that the order of performing block 202 and block 204 may be interchangeable. Alternatively, block 202 and block 204 may also be performed in parallel. The present disclosure is not limited in this aspect.

At block 206, the network device 101 generates an indication of the status information and the length. In this way, the indication generated by the network device 101 relates to the information of the network as well as the terminal device 103. In an example embodiment, the indication may include a static bit string which is meaningful to the network device 101. Alternatively, the indication may include a rule regarding how to generate the first part related to the network. In other embodiments, prefix/suffix key word may be added in the indication of which the position in the identifier is specified.

The indication may further include a parameter of length regarding each parts of the identifier. As described above, in an example embodiment, the identifier may include two parts, i.e., the first part about the network device 101 and the second part about the terminal device 103. In this embodiment, the parameter of length included in the indication specifies the length of the second part and the indication may indicate the sequence of the first part and the second part.

In some embodiments, in block 204, the network device 101 may also generate the indication including activating information associated with activating the indication. In other words, the activating information indicates criteria of generating the identifier. For example, the activating information may include a location of the terminal device. That is, when the terminal device 103 is at the location included in the activating information, the terminal device 103 will generate the identifier for D2D communication.

In an example embodiment, the activating information may include a conflict between the identifier and previous identifier of the terminal device 103, which means the terminal device 103 will generate the identifier if the conflict occurs. In another example embodiment, the activating information may include a time indicating the identifier is needed during a specific duration.

In a further example embodiment, the activating information may include a type of an application executed on the terminal device which may trigger D2D communication. In an additional example embodiment, the activating information may indicate that the terminal device 103 should generate the identifier when a new identifier is needed.

In an example embodiment, the activating information may include a battery power level of the terminal device 103. In another example embodiment, the activating information may include a signal strength level of the terminal device 103. Alternatively, the activating information may include that the terminal device 103 being not served by the E-Utran 105. In other embodiments, the activating information may include one or more the above information.

In some embodiments, the indication may be updated in response to the condition of the network is changed. For example, the change may be subscription information or business application.

At block 208, the network device 101 sends the indication to the terminal device 103 to enable the terminal device 103 to generate the identifier. The indication may be carried in any possible D2D message from the network device 101 to the terminal device 103. For example, the indication may be carried in a pre-configuration procedure or a service authorization procedure defined in 3GPP TS 23.303. In another embodiment, the indication may be carried in a discovery response. In a further embodiment, the indication may be carried in a match report acknowledgement. The indication may also be carried in any specific new message for the identifier generation policy configuration.

In some embodiments, the network device 101 may receive a first identifier generated by the terminal device 103 based on the indication and store the first identifier in a database accessible to the network device 101. For example, the terminal device 101 may store the identifier generated by the terminal device in a public database. In this way, the generated identifier may be retrieved or distributed.

In an example embodiment, the terminal device may request the identifier of a destination terminal device directly from a ProSe UE ID management function of the terminal device 101. In this embodiment, the terminal device 103 may send a message of an identifier request of the destination terminal device to the ProSe UE ID management function of the terminal device 101. The message may include the terminal device identifier (for example, IMEI) and/or name. Alternatively, the message may include ProSe application ID/code. After the above message is received, the network device 101 may retrieve the identifier of the destination terminal device accordingly and send it back to the requested terminal device.

In other embodiments, the ProSe UE ID Management module of the network device 101 may save and maintain the generated identifier in a public database of a ProSe module of the terminal device 101. The ProSe module may read ProSe UE ID from the public database and send it to the terminal device if needed in existing messages. For example, the identifier may be inserted into discovery match report ACK message in the flow of D2D discovery defined by TS23.303.

In some embodiments, the network device 101 may receive a second identifier generated by the terminal device 103 based on the indication and validity information of the second identifier. The network device 101 may trigger the terminal device 103 to generate a further identifier in response to determining that the second identifier is invalid based on the validity information. By way of example, the identifier generated by the terminal device 103 may be carried in a new message self-assigned ProSe ID notify introduced in existing PC3 interface to the network device 101. In some embodiments, associated validity information, for example time-to-live TTL may be provided to the network device to indicate the valid time of the generated identifier. In this embodiment, if there is no updated identifier received by the network device 101 while the existing identifier is invalid, the network device 101 will trigger the terminal device 103 to generate a new identifier.

In some embodiments, the network device 101 may send a further indication including deactivating information associated with deactivating the indication. In other words, the deactivating information indicates deactivating the indication. For example, the deactivating information may include a location of the terminal device. That is, when the terminal device 103 is at the location included in the deactivating information, the terminal device 103 will deactivate the indication of generating the identifier for D2D communication received from the network device 101. In another example embodiment, the deactivating information may include a time indicating the indication is deactivated during a specific duration. In a further example embodiment, the deactivating information may include a type of an application executed on the terminal device which may cause deactivating the indication. It should be noted that the activating information may be any one of the above or any combination thereof. In some embodiments, if the indication has been deactivated, the terminal device 103 may generate an identifier of the D2D communication based on its own provision and/or instructions from upper layers, for example, instructions of a specific application executed on the terminal device 103.

Figure 3:
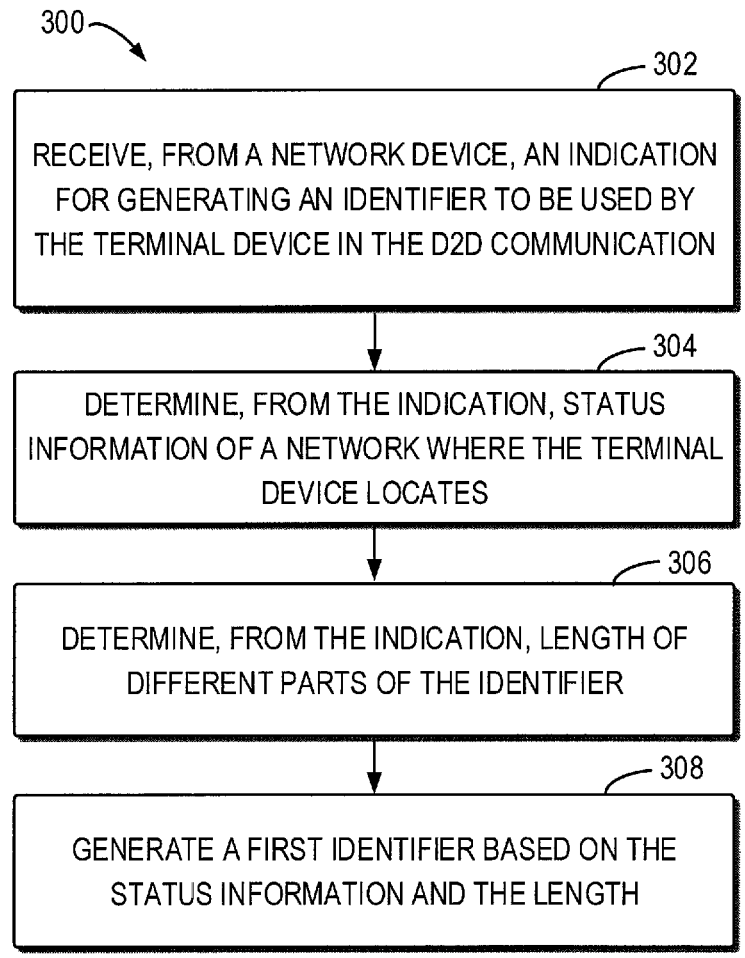
FIG. 3 illustrates a flow chart of a method for facilitating D2D communication implemented at a terminal device according to embodiments of the present disclosure.

FIG. 3 shows a flow chart of a method 300 that may be implemented at the terminal device 103, in accordance with an example embodiment of the present disclosure. At block 302, the terminal device 103 receives an indication for generating an indication for generating an identifier to be used by the terminal device 103 in the D2D communication from a network device 101. In this way, the indication generated by the network device 101 relates to the information of the network as well as the terminal device 103. In some embodiments, the terminal device 103 may receive an initial identifier from the network device 101 for performing the D2D communication prior to block 302. In an example embodiment, the indication may include a static bit string which is meaningful to the network device 101. Alternatively, the indication may include a rule regarding how to generate the first part related to the network so that the terminal device 103 may generate the first part based on the rule. In other embodiments, prefix/suffix key word may be added in the indication of which the position in the identifier is specified.

In some embodiments, in block 302, the terminal device 103 may also receive the indication including activating information associated with activating the indication. In other words, the activating information indicates criteria of generating the identifier. For example, the activating information may include a location of the terminal device. That is, when the terminal device 103 is at the location included in the activating information, the terminal device 103 will generate the identifier for D2D communication.

In an example embodiment, the activating information may include a conflict between the identifier and previous identifier of the terminal device 103, which means the terminal device 103 will generate the identifier if the conflict occurs. In another example embodiment, the activating information may include a time indicating the identifier is needed during a specific duration. In a further example embodiment, the activating information may include a type of an application executed on the terminal device which may trigger D2D communication. In an additional example embodiment, the activating information may indicate that the terminal device 103 needs to generate the identifier when a new identifier is needed.

In some an example embodiments, the activating information may include a battery power level of the terminal device 103. In another example embodiment, the activating information may include a signal strength level of the terminal device 103. Alternatively, the activating information may include that the terminal device 103 being not served by the E-Utran 105. In other embodiments, the activating information may include one or more the above information.

In some embodiments, the indication may be updated in response to the condition of the network is changed. For example, the change may be subscription information or business application.

At block 304 the terminal device 103 may determine status information of a network where the terminal device 103 locates from the indication. By way of example, the status information of the network may be geographic area ID, for example RAN cell ID. In an example embodiment, the status information may be ProSe application ID. It should be noted that the status information may be any information related to the network that are available for the terminal devices 103 in the generation of the identifier, for example ProSe Application Code, filter, communication mode, operator ID, context ID discovery group ID, existing ProSe UE ID and the like.

At block 306, the terminal device 103 determines length of different parts of the identifier from the indication. In an example embodiment, the identifier may include two parts: a first part related to the network device 101 and a second part related to the terminal device 103. In this embodiment, the terminal device 103 determines the lengths of the above two parts from the indication. In an example embodiment, the second part may be zero. Alternatively, the second part may be up to the maximum length of the identifier. It should be noted that the length of the second part may be any length from zero to the maximum length of the identifier.

It should be noted that the order of performing block 304 and block 306 may be interchangeable. Alternatively, block 304 and block 306 may also be performed in parallel. The present disclosure is not limited in this aspect.

At block 308, the terminal device 103 generates a first identifier based on the status information and the length. In some embodiments, the terminal device 103 may generate the first part of the identifier based on the rule included in the indication. Alternatively, the terminal device 103 may generate the first part of the identifier based on the static bit string in the indication. In some embodiments, the terminal device 103 may generate the length of the second part based on the indication and generate the second part based on the local rule of terminal device 103.

In some embodiments, the terminal device 103 may send a first identifier generated based on the indication to the network device 101 for storing in a database accessible to the network device 101. For example, the terminal device 101 may store the identifier generated by the terminal device in a public database. In this way, the generated identifier may be retrieved or distributed.

In an example embodiment, the terminal device 103 may request the identifier of a destination terminal device directly from a ProSe UE ID management function of the terminal device 101. In this embodiment, the terminal device 103 may send a message of an identifier request of the destination terminal device to the ProSe UE ID management function of the terminal device 101. The message may include the terminal device identifier (for example, IMEI) and/or name. Alternatively, the message may include ProSe application ID/code. After the above message is received, the network device 101 may retrieve the identifier of the destination terminal device accordingly and send it back to the requested terminal device.

In other embodiments, the ProSe UE ID Management module of the network device 101 may save and maintain the generated identifier in a public database of a ProSe module of the terminal device 101. The ProSe module may read ProSe UE ID from the public database and send it to the terminal device if needed in existing messages. For example, the identifier may be inserted into discovery match report ACK message in the flow of D2D discovery defined by TS23.303.

In some embodiments, the terminal device 103 may filed out the received frames based on the identifier included in the destination address and deliver the packets to the upper layer. In this way, the indication which includes information regarding the network facilitates the handling of D2D message without further input from the network. By way of example, the indication may include information about an indicator of priority of a terminal device which facilitates to determine the priority of the terminal device.

In some embodiments, the terminal device 103 may send a second identifier generated based on the indication and validity information of the second identifier to the network device 101. The network device 101 may trigger the terminal device 103 to generate a further identifier in response to determining that the second identifier is invalid based on the validity information. By way of example, the identifier generated by the terminal device 103 may be carried in a new message self-assigned ProSe ID notify introduced in existing PC3 interface to the network device 101. In some embodiments, associated validity information, for example time-to-live TTL may be provided to the network device to indicate the valid time of the generated identifier. In this embodiment, if there is no updated identifier received by the network device 101 while the existing identifier is invalid, the network device 101 will trigger the terminal device 103 to generate a new identifier.

In some embodiments, the terminal device 103 may receive a further indication including deactivating information associated with deactivating the indication. In other words, the deactivating information indicates deactivating the indication. For example, the deactivating information may include a location of the terminal device. That is, when the terminal device 103 is at the location included in the deactivating information, the terminal device 103 will deactivate the indication of generating the identifier for D2D communication received from the network device 101. In another example embodiment, the deactivating information may include a time indicating the indication is deactivated during a specific duration. In a further example embodiment, the deactivating information may include a type of an application executed on the terminal device which may cause deactivating the indication. It should be noted that the activating information may be any one of the above or any combination thereof. In some embodiments, if the indication has been deactivated, the terminal device 103 may generate an identifier of the D2D communication based on its own provision and/or instructions from upper layers, for example, instructions of a specific application executed on the terminal device 103.

Figure 4:
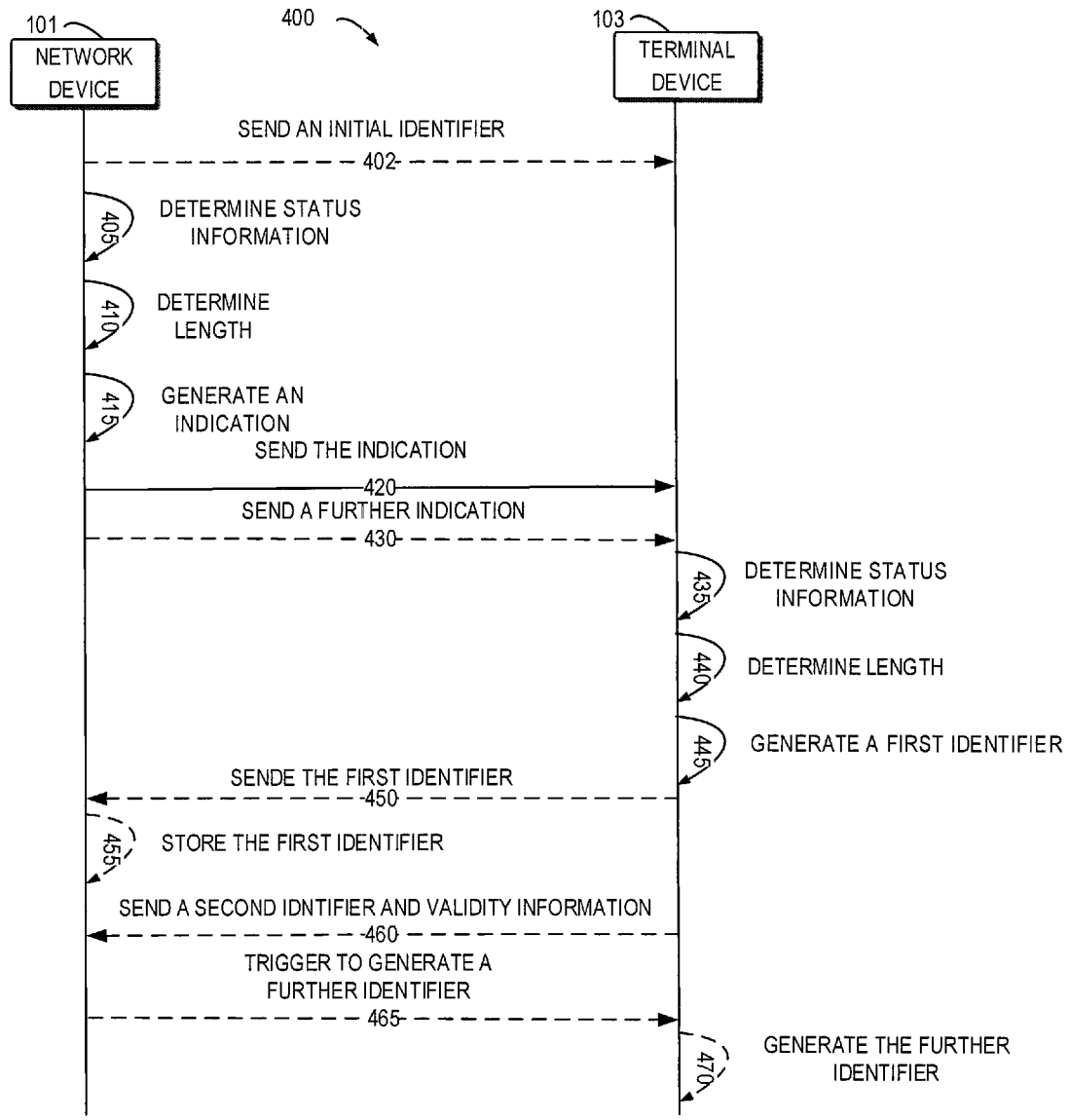
FIG. 4 illustrates a interaction diagram for facilitating D2D communication according to embodiments of the present disclosure.

FIG. 4 shows an example interaction diagram of operations 400 according to some embodiments of the present disclosure. In some embodiments, the network device 101 may send 402 an initial identifier to the terminal device 103 to enable the terminal device 103 to perform the D2D communication prior to generating the indication.

The network device 101 may determine 405 status information of a network where the terminal device 103 locates. The network device 101 may also determine 410 lengths of different parts of an identifier to be used by the terminal device 103 in the D2D communication. The network device 101 may further generate 415 the indication of the status information and the length. In some embodiment, the network device 101 may also generate 415 the indication including activating information associated with activating the indication. The activating information includes at least one of: a conflict between the identifier and previous identifier of the terminal device, a time indicating the identifier needed, a location of the terminal device, a type of an application executed on the terminal device, a battery power level of the terminal device, and a signal strength level of the terminal device.

The network device 101 may additionally send 420 the indication to the terminal device 103 to enable the terminal device 103 to generate the identifier. In some embodiments, the network device 101 may send 430 a further indication including deactivating information associated with deactivating the indication, the deactivating information including at least one of: a time indicating the indication needed to be deactivated, a location of the terminal device, and a type of an application executed on the terminal device.

After receiving the indication from the network device 101, the terminal device 103 may determine 435 status information of the network where the terminal device locates from the indication received from the network device 101. The terminal device 103 may also determine 440 lengths of different parts of the identifier from the indication. The terminal device 103 may further generate 445 a first identifier based on the status information and the length.

In some embodiments, the terminal device 103 may send 450 the generated first identifier to the network device 101.

In this embodiment, the network device 101 may store 455 the first identifier in a database accessible to the network device 101.

In some embodiments, the terminal device 103 may send 460 a second identifier generated based on the indication and validity information of the second identifier to the network device 101. In this embodiment, the network device 101 may trigger 465 the terminal device 103 to generate a further identifier in response to determining that the second identifier is invalid based on the validity information. Further, the terminal device 103 may generate 470 the further identifier. The methods 200 and 300 described with respect to FIGS. 2 and 3 respectively, may be implemented in a machine-to-machine (M2M) system.

Figure 5:
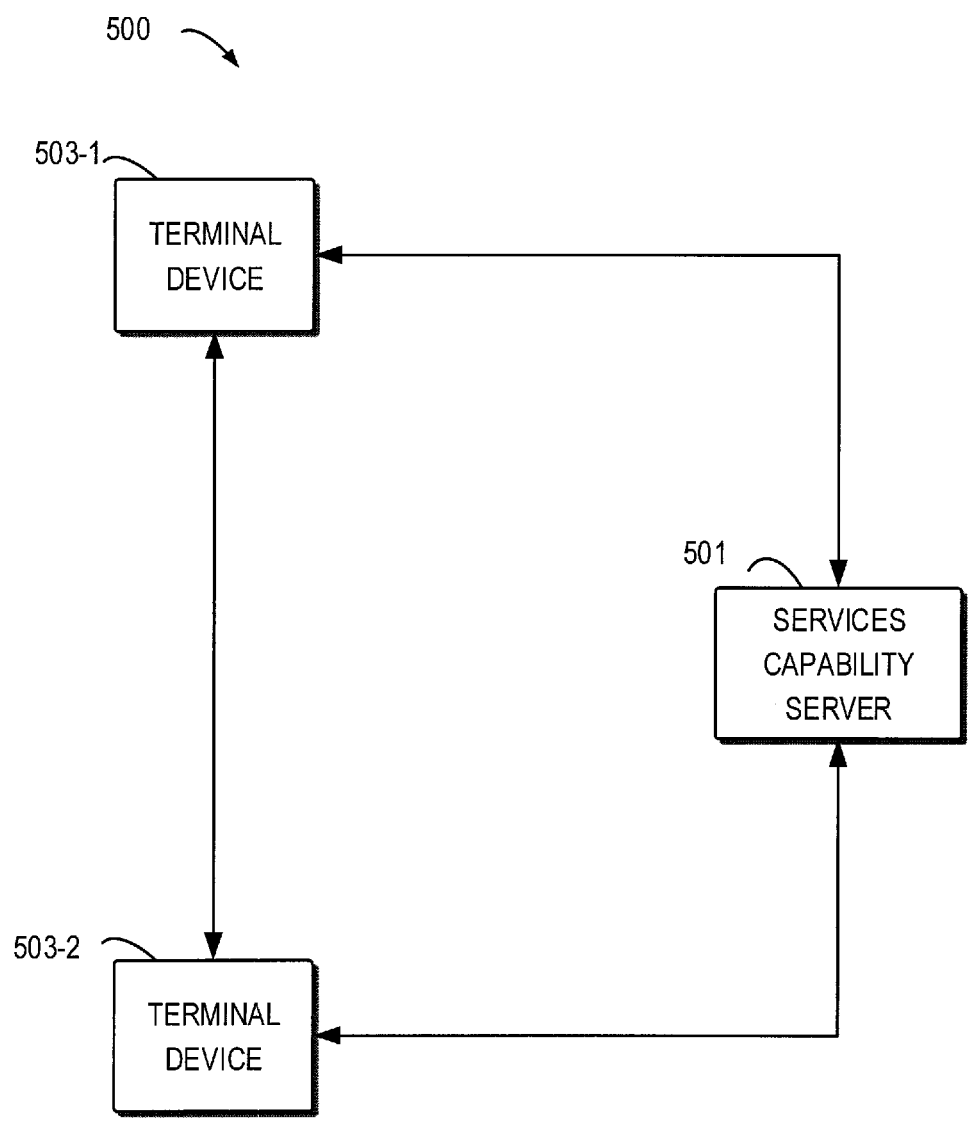
FIG. 5 illustrates a schematic diagram of a device according to embodiments of the present disclosure.

FIG. 5 shows a M2M system 500 where the method 300 and the method 400 may be implemented. The M2M system 500 may include terminal device 503-1, 503-2, . . . , 503-N (collectively "terminal device 503") and services capability server (SCS) 501. It should be noted that the M2M system 500 may include other elements which are omitted for the purpose of clear illustration. The method 200 described above may be implemented at the SCS 501 and the method 300 described above may be implemented at the terminal device 503.

D2D Communication can be used for any wireless communication scenarios including M2M with the benefit of improving overall throughput, spectrum utilization, and energy efficiency. For M2M scenarios, D2D can provide special advantages. As expected by industry, there will be 50 billion connected M2M devices around 2020, How to serve them efficiently is a critical question for any M2M solutions. D2D is a solution for it. According to a research published by Ericsson, it forecasts that up to 90% M2M traffic will be delivered through local connection, i.e., some kind of D2D communications. In a word, D2D is a base technology for M2M.

However, in existing MTC/IoT solutions, D2D communication is only limited in the scenarios of simple D2D relay. For example, connecting some smart IoT devices like wristband, wristwatch, light, TV, refrigerator, microwave oven and the like, through a user's mobile phone or home gateway. In most case, such configuration is manual and static. They cannot be called real D2D communication. For example, in vehicle to vehicle communication scenarios (which is viewed as one of the biggest market of MTC/IoT), vehicle to vehicle direct communication is required in anti-collision scenarios to eliminate communication delay through core network.

To provide such real D2D communication capability in MTC/IoT scenarios, the present disclosure further enhances MTC/IoT platform with the methods 200 and 300 described above.

In the present disclosure, a new function "MTC D2D communication Control Function" is introduced. It is implemented as a software module in Service Capability Server (SCS) 501 with following functionalities. The method 200 may be implemented at the SCS 501.

In some embodiments, the SCS 501 may maintain the mapping between the identifier for D2D communication and the identifier of the terminal device 503.

By way of example, a new MTC device trigger "Subscribe Self-assigned ProSe UE ID" is introduced between the SCS 501 and the terminal device 503 to subscribe the change of the identifier from the terminal device 503. Once the device trigger is received, the terminal device 503 will update its identifier to MTC D2D communication Control Function in SCS 501. An optional parameter "Report Criteria" can also be inserted in the device trigger to subscribe more notify from the terminal device 503, for example, a location change of the terminal device 503, a battery power level of the terminal device 503, a signaling strength level the terminal device 503 and the like.

In some embodiments, after the notification is received from the terminal device 503, "MTC D2D communication Control Function" on SCS 501 may update the mapping between the identifier for D2D communication and the identifier of the terminal device 503 in MTC.

In some embodiments, when a normal MTC device trigger is received in SCS 501, this new logic will be called to check if MTC D2D communication should be triggered.

In some embodiments, the source and destination address (i.e., MTC identifier of terminal device) in the MTC device trigger received will be retrieved and the SCS 501 may check whether the D2D communication is allowed for these terminal devices. If it's allowed, the SCS 501 may perform the following steps. Otherwise, the SCS 501 may perform normal MTC device trigger handling.

In this embodiment, based on the source and destination address (i.e., MTC identifier of terminal device) in the MTC device trigger received, the SCS 501 may retrieve identifier for D2D communication and other information, for example, location information of the terminal device 503. The SCS 501 may compare the location information between the terminal devices 503. If they are in the same location or the distance between them are in the provisioned D2D communication range, the SCS 501 may trigger the D2D communication. Otherwise, the SCS may perform normal MTC device trigger handling.

In some embodiments, the terminal devices 503 start to communicate with each other through the given identifiers directly in the scenarios that are allowed by D2D commutation criteria.

Figure 6:
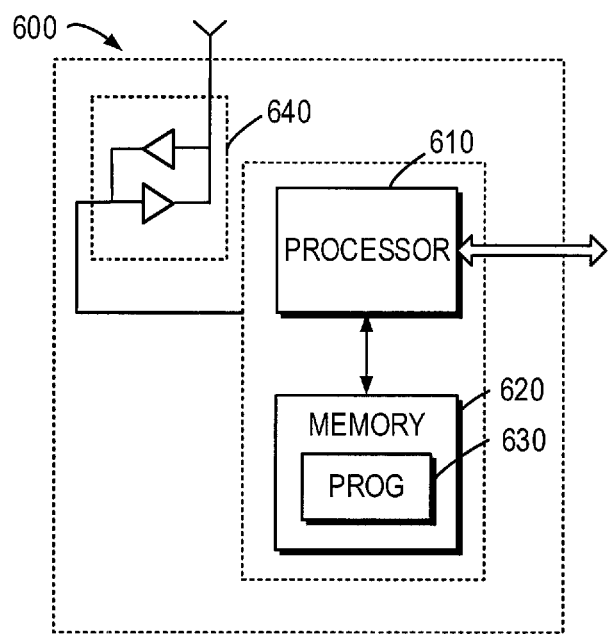
FIG. 6 illustrates a schematic diagram of a machine-to-machine system 600 according to embodiments of the present disclosure.

FIG. 6 is a simplified block diagram of a device 600 that is suitable for implementing embodiments of the present disclosure. The device 600 may be implemented at the network device 101. The device 600 may also be implemented at the terminal device 103. As shown, the device 600 includes one or more processors 610, one or more memories 620 coupled to the processor(s) 610, one or more transmitters and/or receivers (TX/RX) 640 coupled to the processor 610.

The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements.

The program 630 is assumed to include program instructions that, when executed by the associated processor 610, enable the device 600 to operate in accordance with the embodiments of the present disclosure, as discussed herein with reference to FIGS. 2 to 4. That is, embodiments of the present disclosure can be implemented by computer software executable by the processor 610 of the device 600, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method, comprising:
   generating by a network device at least one indication for enabling creation of a proximity-based service (ProSe) user equipment identifier at a terminal device to facilitate device-to-device communication by the terminal device, wherein generating the at least one indication is based on criteria comprising:
   a Machine-Type Communication (MTC) identifier comprising a source address for use by a terminal device in the device-to-device communication,
   status information of a network where the terminal device locates,
   at least one length of different parts of the proximity-based service (ProSe) user equipment identifier to be used by the terminal device in the device-to-device communication, and
   a further indication of the Machine-Type Communication (MTC) identifier, the status information and the at least one length; and
   based on generating the at least one indication, sending the at least one indication based on, the criteria to the terminal device to enable the terminal device to generate the proximity-based service (ProSe) user equipment identifier.

2. The method according to claim 1, wherein generating the at least one indication comprises:
   generating the at least one indication including activating information associated with activating the at least one indication, the activating information including at least one of:
   a conflict between the ProSe user equipment identifier and previous identifier of the terminal device,
   a time indicating the ProSe user equipment identifier needed,
   a location of the terminal device,
   a type of an application executed on the terminal device,
   a battery power level of the terminal device, or
   a signal strength level of the terminal device.

3. The method according to claim 1, further comprising:
   prior to generating the at least one indication, sending an initial identifier to the terminal device to enable the terminal device to perform the device-to-device, communication.

4. The method according to claim 1, further comprising:
   receiving a first identifier generated by the terminal device based on the at least one indication; and storing the first identifier in a database accessible to the network device.

5. The method according to claim 1, further comprising:
   receiving a second identifier generated by the terminal device based on the at least one indication and validity information of the second identifier; and
   in response to determining that the second identifier is invalid based on the validity information, triggering the terminal device to generate a further identifier.

6. The method according to claim 1, further comprising:
   sending an additional further indication including deactivating information associated with deactivating the at least one indication, the deactivating information including at least one of:
   a time indicating the at least one indication needed to be deactivated,
   a location of the terminal device, or
   a type of an application executed on the terminal device.

7. A method, comprising:
   facilitating device-to-device communication comprising:
   receiving, by a terminal device from a network device, at least one indication for use in creating by the terminal device a proximity-based service (ProSe) user equipment identifier to be used by the terminal device in the device-to-device communication; and
   based on the at least one indication: determining, from the at least one indication, a Machine-Type Communication (MTC) identifier comprising a source address for use by a terminal device in the device-to-device communication;

determining, from the at least one indication, status information of a network where the terminal device locates;
determining, from the at least one indication, length of different parts of the proximity-based service (ProSe) user equipment identifier, and
generating a first identifier based on the Machine-Type Communication (MTC) identifier, the status information and the length.

8. The method according to claim 7, wherein receiving the at least one indication comprises:
receiving the at least one indication including activating information associated with activating the at least one indication, the activating information including at least one of:
a conflict between the ProSe user equipment identifier and previous identifier of the terminal device,
a time indicating the ProSe user equipment identifier needed,
a location of the terminal device,
a type of an application executed on the terminal device,
a battery power level of the terminal device, or
a signal strength level of the terminal device.

9. The method according to claim 7, further comprising:
prior to generating the first identifier, receiving an initial identifier from the network device to enable the terminal device to perform the device-to-device communication.

10. The method according to claim 7, further comprising:
sending the first identifier to the network device for storing in a database accessible to the network device.

11. The method according to claim 7, further comprising:
sending a second identifier generated based on the at least one indication and validity information of the second identifier to the network device; and
in response to determining that the second identifier is invalid based on the validity information, generating a further identifier triggered by the network device.

12. The method according claim 7, further comprising:
receiving a further indication including deactivating information associated with deactivating the at least one indication, the deactivating information including at least one of:
a time indicating the at least one indication needed to be deactivated,
a location of the terminal device, or
a type of an application executed on the terminal device.

13. A network device, comprising:
at least one processor; and
a memory coupled to the at least one processor, the memory storing instructions therein, the instructions, when executed by the at least one processor, causing the network device to perform acts including:
generating by the network device at least one indication for enabling creation of a proximity-based service (ProSe) user equipment identifier at a terminal device to facilitate device-to-device communication by the terminal device, wherein generating the at least one indication is based on criteria comprising:
a Machine-Type Communication (MTC) identifier comprising a source address to be used by the terminal device in the device-to-device communication,
status information of a network where the terminal device locates,
at least one length of different parts of the proximity-based service (ProSe) user equipment identifier to be used by the terminal device in the device-to-device communication, and
a further indication of the Machine-Type Communication (MTC) identifier, the status information, and the at least one length; and
based on generating the at least one indication, sending the at least one indication based on the criteria to the terminal device to enable the terminal device to generate the proximity-based service (ProSe) user equipment identifier.

14. The network device of claim 13, wherein generating the at least one indication comprises:
generating the at least one indication including activating information associated with activating the at least one indication, the activating information including at least one of:
a conflict between the ProSe user equipment identifier and previous identifier of the terminal device,
a time indicating the ProSe user equipment identifier needed,
a location of the terminal device,
a type of an application executed on the terminal device,
a battery power level of the terminal device, or
a signal strength level of the terminal device.

15. The network device of claim 13, wherein the acts further include:
prior to generating the at least one indication, sending an initial identifier to the terminal device to enable the terminal device to perform the device-to-device communication.

16. The network device of claim 13, wherein the acts further include:
receiving a first identifier generated by the terminal device based on the at least one indication; and
storing the first identifier in a database accessible to the network device.

17. The network device of claim 13, wherein the acts further include:
receiving a second identifier generated by the terminal device based on the at least one indication and validity information of the second identifier; and
in response to determining that the second identifier is invalid based on the validity information, triggering the terminal device to generate a further identifier.

18. The network device of claim 13, wherein the acts further include:
sending an additional further indication including deactivating information associated with deactivating the at least one indication, the deactivating information including at least one of:
a time indicating the at least one indication needed to be deactivated,
a location of the terminal device, or
a type of an application executed on the terminal device.

19. A terminal device, comprising:
at least one processor; and
a memory coupled to the at least one processor, the memory storing instructions therein, the instructions, when executed by the at least one processor, causing the terminal device to perform acts including:
receiving, by the terminal device from a network device, an at least one indication for use in generating by the terminal device a proximity-based service (ProSe) user equipment identifier to be used by the terminal device in the device-to-device communication; and
based on the at least one indication:
determining, from the at least one indication, a Machine-Type Communication (MTC) identifier comprising a source address for use by a terminal device in the device-to-device communication;

determining, from the at least one indication, status information of a network where the terminal device locates;

determining, from the at least one indication, length of different parts of the ProSe user equipment identifier; and generating a first identifier based on the Machine-Type Communication (MTC) identifier, the status information, and the length.

20. The terminal device of claim 19, wherein receiving the at least one indication comprises:

receiving the at least one indication including activating information associated with activating the at least one indication, the activating information, including at least one of:

a conflict between the ProSe user equipment identifier and previous identifier of the terminal device, a time indicating the ProSe user equipment identifier needed, a location of the terminal device, a type of an application executed on the terminal device, a battery power level of the terminal device, or a signal strength level of the terminal device.

21. The terminal device of claim 19, wherein the acts further include:

prior to generating the first identifier, receiving an initial identifier from the network device to enable the terminal device to perform the device-to-device communication.

22. The terminal device of claim 19, wherein the acts further include:

sending the first identifier to the network device for storing in a database accessible to the network device.

23. The terminal device of claim 19, wherein the acts further include:

sending a second identifier generated based on the at least one indication and validity information of the second identifier to the network device; and in response to determining that the second identifier is invalid based on the validity information, generating a further ID triggered by the network device.

24. The terminal device of claim 19, wherein the acts further include:

receiving a further indication including deactivating information associated with deactivating the at least one indication, the deactivating information including at least one of:

a time indicating the at least one indication needed to be deactivated, a location of the terminal device, or a type of an application executed on the terminal device.

25. A non-transitory computer readable medium storing instructions thereon, the instructions, when executed by at least one processing unit of a machine, causing the machine to perform:

generating by a network device at least one indication for enabling creation of a proximity-based service (ProSe) user equipment identifier at a terminal device to facilitate device-to-device communication by the terminal device, wherein generating the at least one indication is based on criteria comprising:

a Machine-Type Communication (MTC) identifier, comprising a source address for use by a terminal device in the device-to-device communication, status information of a network where the terminal device locates, at least one length of different parts of the proximity-based service (ProSe) user equipment identifier to be used by the terminal device in the device-to-device communication, and a further indication of the Machine-Type Communication (MTC) identifier, the status information and the at least one length; and based on generating the at least one indication, sending the at least one indication based on the criteria to the terminal device to enable the terminal device to generate the proximity-based service (ProSe) user equipment identifier.

26. A non-transitory computer readable medium storing instructions thereon, the instructions, when executed by at least one processing unit of a machine, causing the machine to perform:

facilitating device-to-device communication comprising:

receiving, by a terminal device from a network device, at least one indication for use in creation by the terminal device a proximity-based service (ProSe) user equipment identifier to be used by the terminal device in the device-to-device communication; and based on the at least one indication:

determining, from the at least one indication, a Machine-Type Communication (MTC) identifier comprising a source address for use by a terminal device in the device-to-device communication;

determining, from the at least one indication, status information of a network where the terminal device locates;

determining, from the at least one indication, length of different parts of the proximity-based service (ProSe) user equipment identifier; and generating a first identifier based on the Machine-Type Communication (MTC) identifier, the status information and the length.

* * * * *